United States Patent
Ojima et al.

[11] Patent Number: 5,400,883
[45] Date of Patent: Mar. 28, 1995

[54] ROTATION LOCKING DEVICE

[75] Inventors: Juji Ojima, Aikawa; Yoshiharu Kitamura; Kouichi Yamamuro, both of Komagane, all of Japan

[73] Assignee: NHK Spring Co., Ltd., Kanagawa, Japan

[21] Appl. No.: 231,965

[22] Filed: Apr. 22, 1994

Related U.S. Application Data

[63] Continuation of Ser. No. 51,591, Apr. 26, 1993, abandoned, which is a continuation of Ser. No. 734,457, Jul. 23, 1991, abandoned.

[51] Int. Cl.⁶ .................... F16D 69/00; B60T 7/06
[52] U.S. Cl. .................... 188/381; 188/82.6
[58] Field of Search ............ 188/77 W, 82.6; 192/81 C, 8 R, 415, 8 C; 464/39, 40; 74/531; 403/213

[56] References Cited

U.S. PATENT DOCUMENTS

| | | | |
|---|---|---|---|
| 1,997,646 | 4/1935 | Miller | 192/81 C |
| 2,575,012 | 11/1951 | Harvey | 192/81 C |
| 3,135,369 | 6/1964 | Nisenson et al. | 192/8 C |
| 3,405,791 | 10/1968 | Kaplan | 188/77 W X |
| 4,055,935 | 11/1977 | Malion et al. | 188/77 W X |
| 4,705,318 | 11/1987 | Yamada et al. | 188/77 W X |
| 4,926,987 | 5/1990 | Honma | 192/8 C |
| 5,058,720 | 10/1991 | Rude et al. | 192/816 X |
| 5,230,410 | 7/1993 | Yamamuro | 192/8 C |
| 5,275,262 | 1/1994 | Ojima et al. | 192/415 |

FOREIGN PATENT DOCUMENTS 161814 7/1991 Japan.

Primary Examiner—Robert J. Oberleitner
Assistant Examiner—Chris Schwartz
Attorney, Agent, or Firm—Keck, Mahin & Cate

[57] ABSTRACT

A rotation locking device wherein a control component is provided so that a partial enlargement of coil elements thereof causing a delay of locking operation due to a continuous change of rotational direction of a rotating body is prevented and a partial deformation of a hook portion thereof is prevented.

5 Claims, 5 Drawing Sheets

ROTATION LOCKING DEVICE

This is a continuation of application Ser. No. 08/051,591, filed Apr. 26, 1993, abandoned, which is a continuation of application Ser. No. 07/734,457, filed Jul. 23, 1991, abandoned.

BACKGROUND OF THE INVENTION

The present invention relates to a rotation locking device locking a rotation of a rotating body by a frictional force caused by a fastening force of a coil spring.

This type of conventional rotation locking devices 100 are shown in FIGS. 8 and 9.

The rotation locking devices 100 comprise a shaft 2 extended from a flange portion 2b to be fixed on an equipment, a rotatable sleeve 3 mounted rotatably on a shaft portion 2a of the shaft 2 and a coil spring 4 closely and externally inserted over the rotatable sleeve 3. The rotatable sleeve 3 is retained by a snap ring 6 inserted into a ring ,groove formed on the outer surface of the shaft 2.

The coil spring 4 is made of round material in the manner that the free diameter thereof is smaller than the outer diameter of the sleeve 3, and is mounted on the sleeve 3 after being enlarged. The coil spring 4 has a free end 4a extended radially and another end 4b extended coaxially and inserted into the flange portion 2b.

In this case, the reverse turn of the rotatable sleeve 3 can be done easily, but the foward turn thereof can be locked by a frictional force caused by the coil spring 4. The locking force can be released by pushing the hook 4a in the unwinding direction of the coil spring 4.

However, the conventional rotation locking device has problems as follows:

(1) When the rotatable sleeve 3 is turned backward continuously, without giving a pause, the rotatable sleeve 3 is locked after being rotated some angular position, which is caused by a time delay of winding operation of the coil element $C_1$ next to the hook 4b. The coil element $C_1$ is wound tightly last on the shaft when the hook 4a is wound.

In order to prevent this type of play or delay, the present applicant disclosed a Japanese Patent Application No. 1-301778, wherein a rotation locking device having a coil spring 4 covered by an elastic material such as spiral spring causing a fastening force on a shaft portion, which permits a locking effect without delay because the elastic material restrains a partial enlargement of the coil spring. However, in this case, it is necessary to unlock the fastening force of the coil spring 4 because the fastening force of the elastic material works on the coil spring 4. Accordingly, when an unlocking force becomes larger, the unwinding rotation of the rotatable sleeve 3 becomes larger too, prejudicing the operability of the device.

(2) When the hook 4a is dislocated to unlock, the whole coil elements are not unwound uniformly and coil element $C_2$ in the proximity of the hook 4a deforms largely as shown in FIGS. 9(b) and 9(c). Even when the operating force F onto the hook 4a is removed, the deformation of the coil element $C_2$ remains and the coil element $C_2$ floats from the rotatable sleeve 3 as indicated by "l" in FIG. 9(d), causing a delay of locking force.

The present invention was developed taking this situation into consideration and provides a rotation locking device permitting a locking operation without delay, an unlocking operation with a minor force and a smooth reverse turn of the rotatable sleeve.

BRIEF DESCRIPTION OF THE INVENTION

The present invention provides a rotation locking device using a fastening force of a coil spring, which is provided with a control device mounted on the coil spring providing a gap therebetween.

The control device may be formed by a sleeve or a plate provided over the coil spring.

Other control devices may be formed by a plate provided in the proximity of a fixed hook or a rotatable roller. The control devices prevent a partial enlargement of the coil spring. Therefore, the coil spring is closely wound over the rotatable sleeve when the rotatable sleeve is turned in the unwinding direction of the coil spring, and the rotatable sleeve turns in the same direction sliding on the coil spring. When the rotatable sleeve begins to turn in the winding direction of the coil spring, the rotation thereof is instantaneously locked by the frictional force of the coil spring.

The control plate and the coil spring are faced at a predetermined distance, accordingly the enlargement of the coil spring is not impeded by the plate, which works to reduce an operating force therein.

DETAILED DESCRIPTION OF THE PREFERRED EMBODIMENTS

Figure 1A:
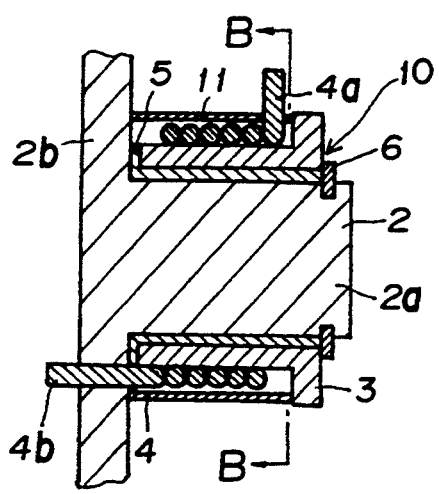
FIG. 1(a) shows a vertical sectional view of an embodiment according to the present invention.

Hereinafter, the present invention will be described referring to the drawings. Corresponding components to the prior art will be indicated with the same numerals.

In FIGS. 1 to 7, a rotatable sleeve 3 is rotatably and externally inserted on a shaft portion 2a of a shaft 2 through a bushing 5. A coil spring 4 is closely wound over the rotatable sleeve 3, of which basic construction is same with that of prior art .

Figure 1B:
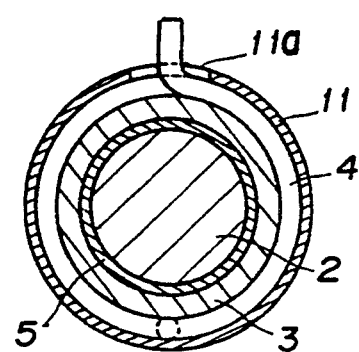
FIG. 1(b) shows a sectional view along line B—B.

In a rotation locking device 10 shown in FIGS. 1(a) and 1(b), a free hook 4a is extended radially and a fixed hook 4b is inserted into a flange portion 2b. A cylindrical control component 11 is provided on the outer surface of the coil spring 4. The cylindrical control component 11 is of inner diameter little larger than the outer diameter of the coil spring 4. A gap is formed between the coil spring 4 and the cylindrical control component 11. The gap is free from the coil spring 4 when in normal condition, but the inner wall of the cylindrical component 11 abuts on the coil spring 4 to restrain the enlargement of diameter thereof when a partial enlargement of coil element occurs by changing a rotational direction of the rotatable sleeve.

In this case, it is possible to prevent a partial enlargement of coil spring diameter, to apply a frictional force for locking onto the rotatable sleeve 3 and to eliminate a play therein. Also, an operating force onto the rotatable sleeve 3 for locking in the unwinding direction of the coil spring can be reduced and operability thereof can be improved because of no fastening force of the coil spring 4.

Numeral 11a indicates a slit formed on the cylindrical component 11 into which a free hook portion 4a of the coil spring 4 is inserted. Accordingly, an unlocking work of the hook 4a can be performed smoothly. Since a partial enlargement of coil element occurs in the proximities of the hook 4a and 4b, the same effect can be obtained even when the cylindrical component 11 is divided into two parts and located only in the proximity of the hooks 4a and 4b.

Figure 2A:
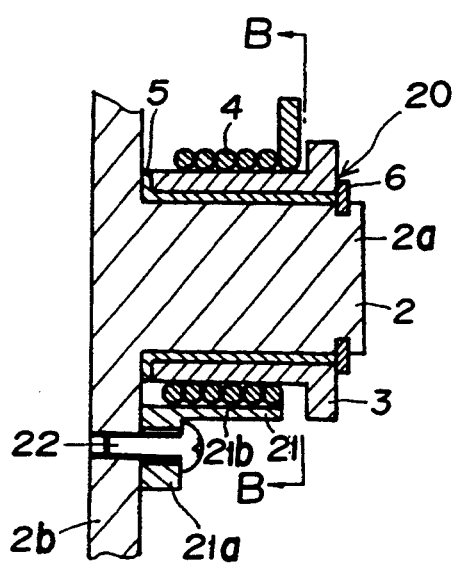
FIG. 2(a) shows a vertical sectional view of a second embodiment.
Figure 2B:
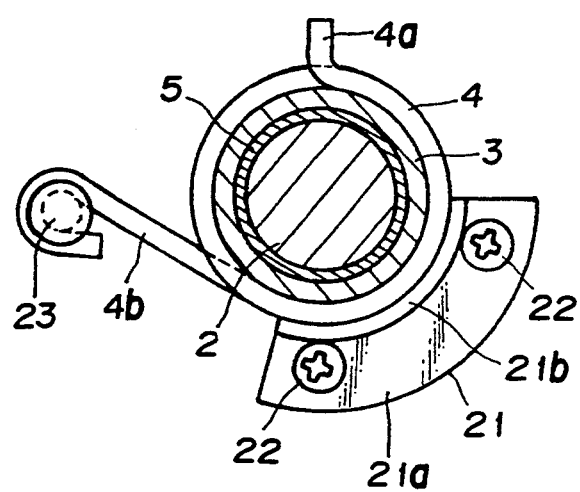
FIG. 2(b) shows a sectional view along line B—B.

In FIGS. 2(a) and 2(b), a second embodiment 20 is shown. A free hook end 4a of the coil spring 4 is extended radially. A fixed hook 4b is extended in radial direction and fixed by a pin 23. An arc shaped control plate 21 is used. The control plate is of a quarter arc plate of which bottom 21a is screwed on a flange portion 2b of a shaft 2. A cylinder portion 21b of the arc plate 21 faces the outer surface of the coil spring 4 at a predetermined distance and restrains a partial enlargement of coil elements of the coil spring 4.

Figure 3:
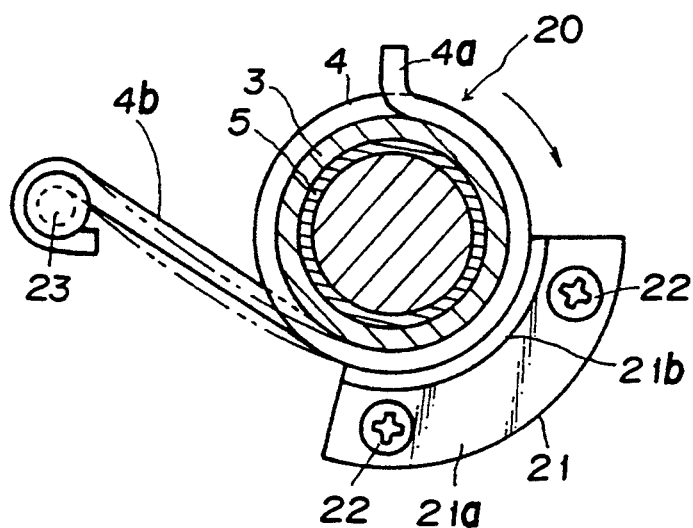
FIG. 3 shows a function of the second embodiment.
Figure 4:
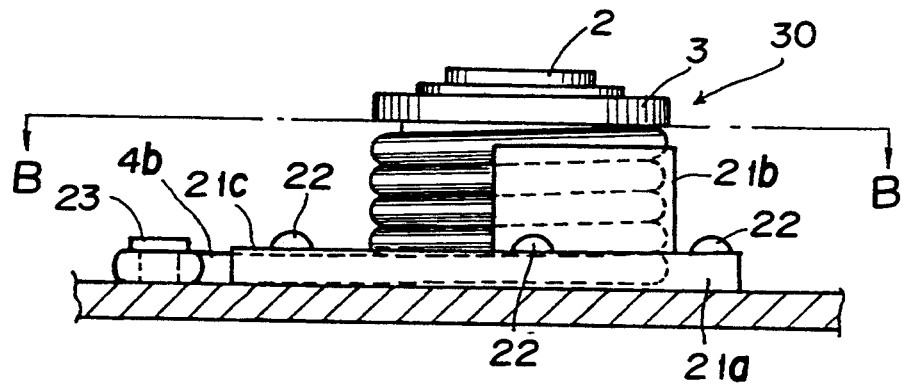
FIG. 4(a) shows a side view of a third embodiment.
FIG. 4(b) shows a sectional view along line B—B.
Figure 4:
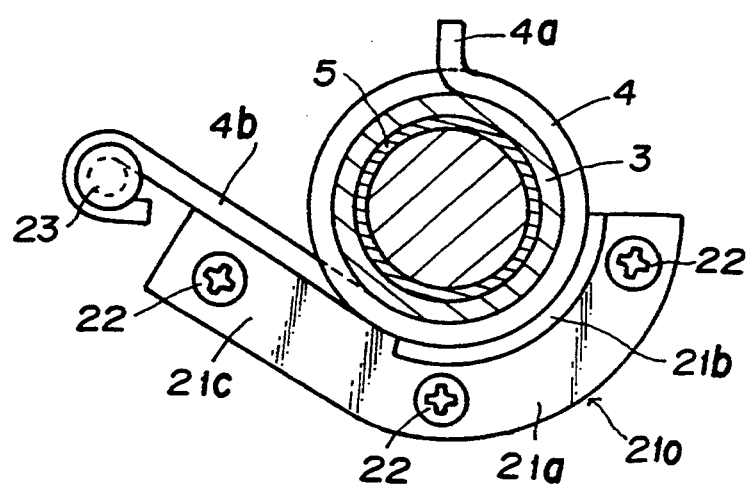

In this embodiment, it is, sometimes, necessary to provide a longer hook portion 4b depending to a location applied as shown in FIG. 3. In this case, when the rotatable sleeve 3 is turned in the unwinding direction (indicated with an arrow in FIG. 3), the hook 4b deforms as shown with double dotted line in FIG. 3. Then, it is impossible to lock the rotatable sleeve 3 in the state when a winding force is applied on the rotatable sleeve 3. When the hook 4b is turned to the positon shown with a line in FIG. 3, the rotation of the rotatable sleeve in the winding direction is locked. In conclusion, when occurs a deform on the hook 4b, it is inevitable to have a delay or a play of locking operation.

In FIGS. 4(a) and 4(b), a third embodiment of rotation locking device is shown, wherein the delay or play of locking operation is presented. There is only a difference on the control component between the second and third embodiments.

The control component 210 of the rotation locking device 30 comprises a quarter arc portion 21a, a hook supporting portion 21c and a quarter cylindrical portion 21b. The hook supporting portion 21c prevents the hook 4b from deforming. The cylindrical portion 21b faces the outer surface of the coil spring 4 and prevents a partial enlargement of the coil elements.

In this case, the deformation of the hook 4b due to the rotation of the rotatable sleeve in the unwinding direction can be prevented and when the rotation of the sleeve 3 is changed from the winding direction to the unwinding direction, the rotation of the rotatable sleeve 3 can be locked without delay or play.

Figure 5:
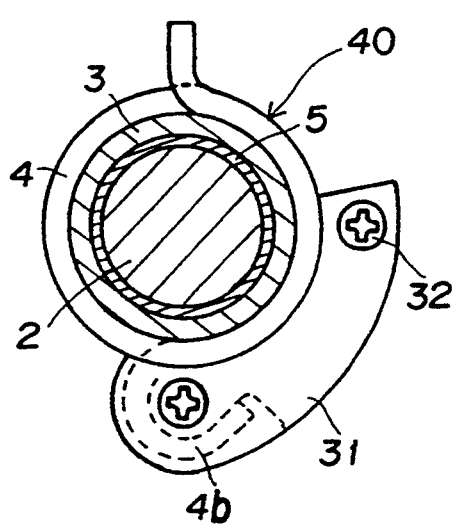
FIG. 5 shows a sectional view of a fourth embodiment.

In FIG. 5, a fourth embodiment, further embodiment of the second embodiment is shown. In this case, a control plate 31 is screwed onto the base with bolts 32 facing the outer surface of coil spring 4. A hook portion 4b is fastened on the lower surface of the control plate 31. Accordingly, the control plate 31 not only prevents a partial enlargement of the coil spring 4, but functions as a receiving component of the coil spring 4, simplifying a total construction thereof.

Figure 6A:
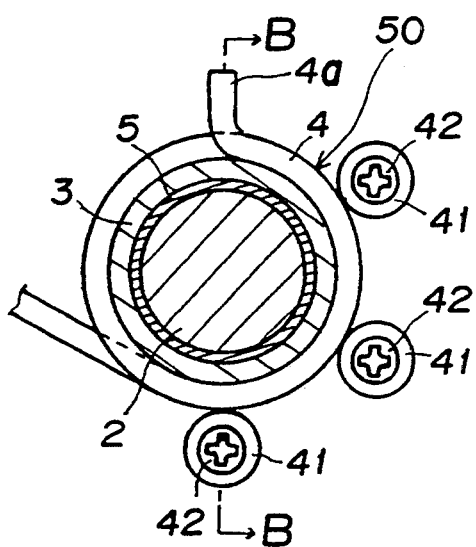
FIG. 6(a) shows a sectional view of a fifth embodiment.
Figure 6B:
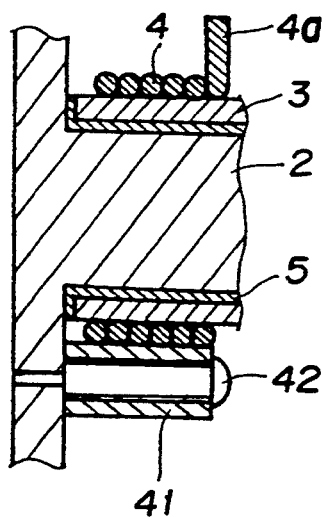
FIG. 6(b) shows a sectional view along line B—B.

In FIGS. 6(a) and 6(b), a fifth embodiment is shown. In this rotation locking device 50, a plurality of rollers 41 are provided on the outer surface of a coil spring 4. The rollers 41 are rotatably mounted on pins 42 at a determined distance so as to function as control devices. The rollers 41 prevent a partial enlargement of the coil spring 4, but the coil element near to the hook 4a slides on the rollers 41 smoothly which improves the operability of unlocking operation. As shown in FIG. 6(b), each of the rollers 41 has an axial length great enough so that it overlies all coils of the coil spring 4.

Figure 7A:
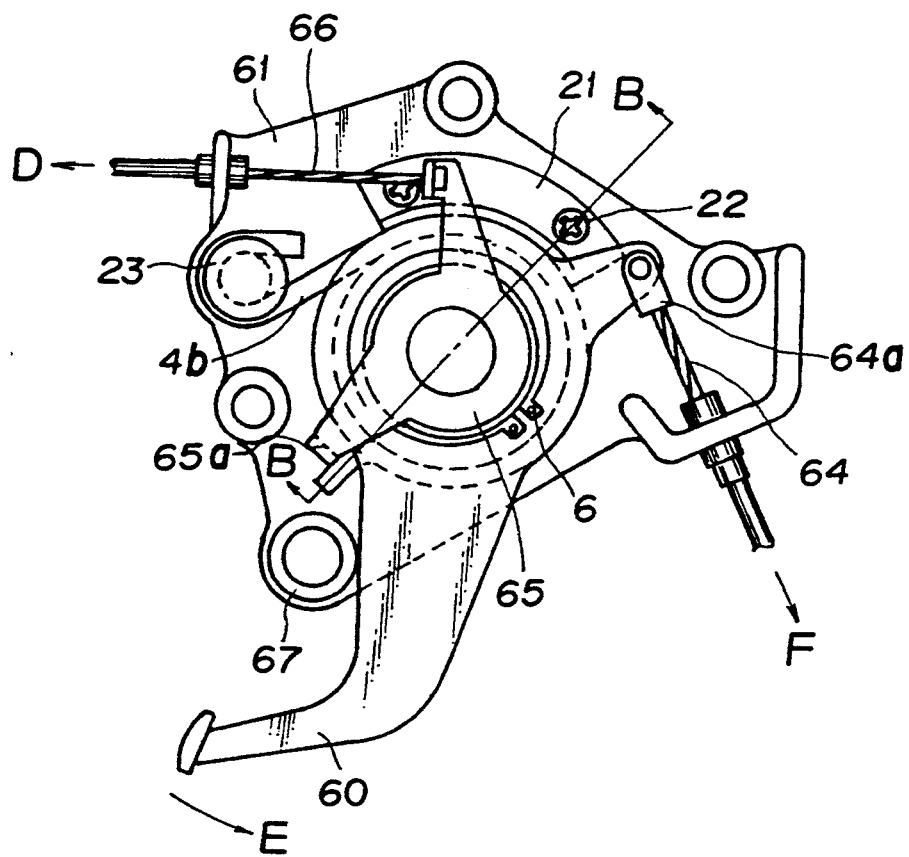
FIG. 7(a) shows a plan view of an embodiment according to the present invention applied on a parking brake device.
Figure 7B:
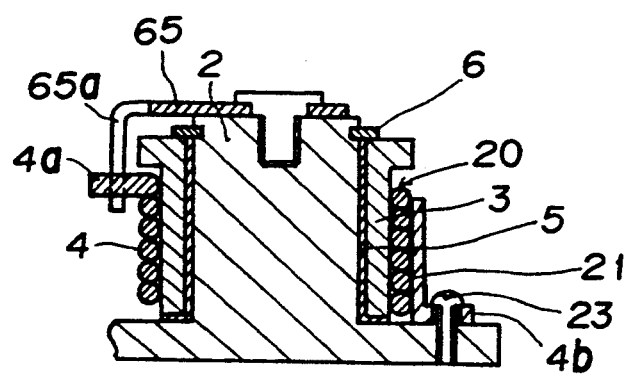
FIG. 7(b) shows a sectional view along line B—B.
Figure 8A:
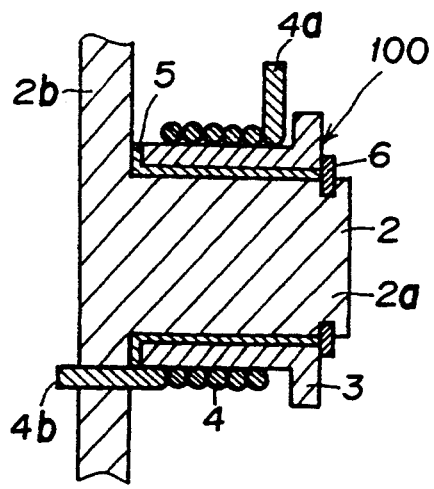
FIG. 8(a) shows a vertical sectional view of a prior art device.
Figure 8B:
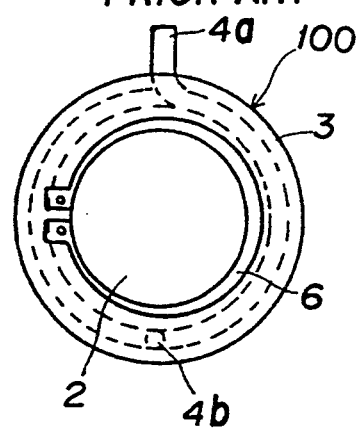
FIG. 8(b) shows a side view thereof.
Figure 9A:
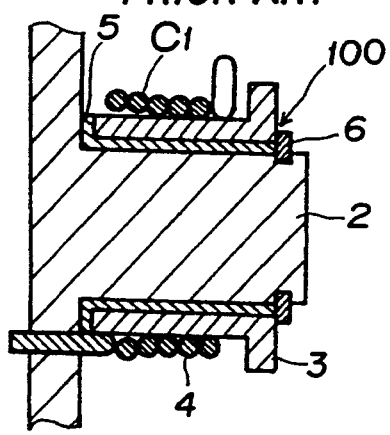
FIGS. 9(a), 9(b), 9(c) and 9(d) show the function of the prior art device.
Figure 9B:
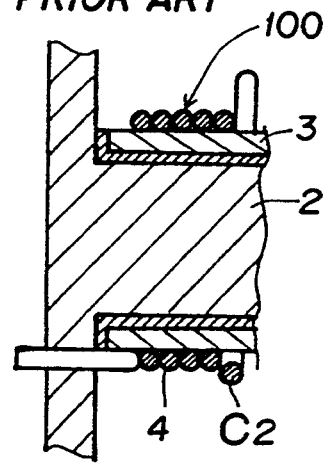
Figure 9C:
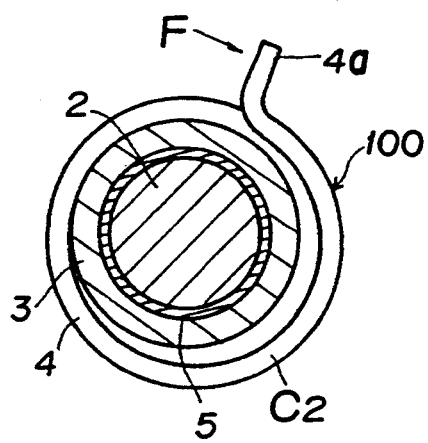
Figure 9D:
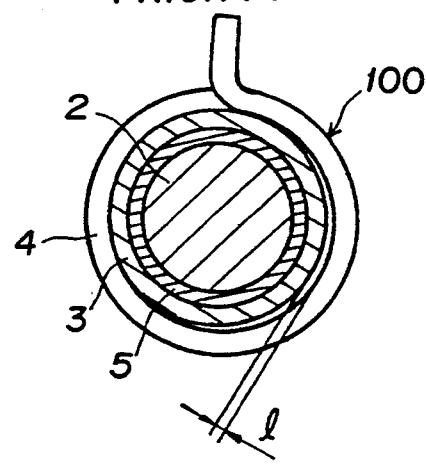

In FIGS. 7(a) and 7(b), a rotation locking device 20 applied on a parking brake device.

The rotation locking device 20 is provided on the rotational center of a brake pedal 60.

The rotation locking device 20 comprises a shaft 2 integrally constructed with a bracket 61, a rotatable sleeve 3 rotatably inserted over the shaft 20 through a bushing 5, a coil spring 4 closely and externally inserted over the rotatable sleeve 3 and a control plate 21 partially facing coil elements of the coil spring 4.

The rotatable sleeve 3 is fixed on a brake pedal 60. When the brake pedal 60 is depressed, the rotatable sleeve 3 turns together with the brake pedal 60. On a protruding end of the brake pedal 60, an end 64a of a brake cable 64 is pivoted. Then, a treading action on the brake pedal 60 is transmitted to the parking brake (not shown).

A hook 4b of the coil spring 4 is fixed on a bracket 61 with a pin 23. Another hook 4a is secured by a protruding portion 65a of a release collar 65 rotatably mounted on the upper end of the shaft 2. A release cable 66 is connected to the release collar 65. The hook 4a of the coil spring 4 can be controlled by operating the release cable 66.

Numeral 67 indicates a cushion absorbing a shock due to a returning action of the brake pedal 60 and positions the brake pedal 60.

The operation of the parking brake device Will be described as follows:

The parking brake is not shown. When the brake pedal 60 is turned to the direction indicated with an arrow E, the brake cable 64 is pulled out and the parking brake is operated. The rotatable sleeve 3 rotates smoothly sliding on the coil spring 4, because the rotation of the brake pedal in the direction E is the same as the unwinding direction of the coil spring 4. A partial enlargement of coil elements of the coil spring 4 is prevented by the control plate 21 during the rotation of rotatable sleeve 3. Accordingly, all of the coil elements are closely wound on the outer surface of the rotatable sleeve 3.

The brake cable 64 is always tensioned in the direction indicated with an arrow F by a return spring of the parking brake (not shown). The brake pedal tends to restore former position when the treading action is stepped, but the rotation of the rotatable sleeve 3 is instantly locked because the rotatable sleeve turns in the winding direction of the coil spring 4. In other words, even though the foot is removed in working position from the brake pedal 60, the parking brake is maintained in working position.

In order to release the parking brake, the release cable 66 is pulled in the direction indicated with an arrow D. The release collar 65 turns in the unwinding direction of the coil spring 4. The hook 4a moves in the same direction. The diameter of the coil spring 4 enlarges, then the rotatable sleeve 3 can be rotated in the winding direction of coil spring 4 and the brake pedal 60 restored to the former position, because the brake pedal is pulled in the restoring direction by the return spring of the parking brake device.

The parking brake device is free from the enlargement of the coil spring 4 and the coil spring 4 is always wound closely on the rotatable sleeve 3. When the rotatable sleeve 3 is turned in the winding direction of the coil spring 4, the rotation thereof is instantly locked and the brake pedal 60 is stopped at the treaded position, the most effective position of the parking brake.

As aforementioned above, the rotation locking device according to the present invention prevents the partial enlargement of coil elements and the deformation of the fixed hook of the coil spring even when the rotatable sleeve is turned in the unwinding direction of the coil spring because of a control plate and cylindrical portion thereof facing the outer surface of the coil spring at a predetermined distance. Therefore, the coil spring is always wound closely on the rotatable sleeve and the delay of locking operation can be prevented.

The cylindrical portion of the control plate has a predetermined gap between the outer surface of the coil spring, therefore the unlocking operation and the rotation of the rotatable sleeve can be done by applying minor force, resulting in improvement of operability.

What is claimed is:

1. A rotation locking device for locking rotation of a rotating body relative to a stationary body by frictional force due to a fastening force of a coil spring, comprising:
    a coil spring, closely wound on the rotating body, installed by hooking one end thereof to a fixed portion of said stationary body and allowing the other end to be actuated by an external force, wherein when the rotating body is turned relative to said stationary body in an unwinding direction of the coil spring, the rotating body turns in the unwinding direction, sliding on the coil spring, and when the rotating body turns relative to said stationary body in a winding direction of the coil spring, the rotation of the rotating body is locked by the frictional force of the coil spring, and
    a control plate including a cylindrical portion facing a partial angular outer surface of said coil spring and extending over at least one coil of said coil spring, said control plate being formed together with said cylindrical portion.

2. A rotation locking device according to claim 1 wherein said one end is a fixed hook fastened to said control plate.

3. A rotation locking device according to claim 1 wherein said control plate also includes a hook supporting portion facing said fixed hook to prevent said fixed hook from deforming.

4. A rotation locking device for locking rotation of a rotating body relative to a stationary body by frictional force due to a fastening force of a coil spring, comprising:
    a coil spring, closely wound on the rotating body, installed by hooking one end thereof to a fixed portion of said stationary body and allowing the other end to be actuated by an external force, wherein when the rotating body is turned relative to said stationary body in an unwinding direction of the coil spring, the rotating body turns in the unwinding direction, sliding on the coil spring, and when the rotating body turns relative to said stationary body in a winding direction of the coil spring, the rotation of the rotating body is locked by the frictional force of the coil spring, and
    a plurality of rollers, each of said rollers being rotatably positioned parallel to said coil spring so as to face an outer surface thereof at a predetermined distance from said outer surface.

5. A rotation locking device according to claim 4, wherein each of said rollers has an axial length great enough so that it overlies all coils of said coil spring.

* * * * *